United States Patent

Durieux et al.

Patent Number: 6,059,687
Date of Patent: May 9, 2000

[54] AUTOMOTIVE VEHICLE INCORPORATING A TRANSMISSION EQUIPPED WITH AN ACTUATING LOGIC PERFORMING THE "SHIFT-LOCK" AND "KEY-LOCK" FUNCTIONS

[75] Inventors: Jean Marc Durieux; Stéphone Sauvyre, both of Montbeliard, France

[73] Assignees: Automobiles Peugeot, Paris; Automobiles Citroën, Neuilly Sûr Seine, both of France

[21] Appl. No.: 08/785,055

[22] Filed: Jan. 17, 1997

[30] Foreign Application Priority Data

Jan. 19, 1996 [FR] France ................................ 96 00622

[51] Int. Cl.⁷ ...................... B60K 41/28; B60K 41/04; B60K 41/26
[52] U.S. Cl. ........................ 477/94; 477/96; 477/99; 192/220.2; 74/483 R; 70/245
[58] Field of Search ................... 477/96, 99, 94; 192/4 A, 220, 220.2, 220.3, 220.4, 220.5, 220.6, 220.7; 74/473.21, 473.23, 473.24, 483 R; 70/245, 249, 250

[56] References Cited

U.S. PATENT DOCUMENTS

| | | | |
|---|---|---|---|
| 4,513,276 | 4/1985 | Kubota et al. | 477/99 X |
| 4,887,702 | 12/1989 | Ratke et al. | 477/99 X |
| 5,036,962 | 8/1991 | Amagasa | 74/483 R |
| 5,096,033 | 3/1992 | Osborn | 192/220.7 X |
| 5,181,592 | 1/1993 | Pattocko | 477/99 X |
| 5,197,356 | 3/1993 | Kobayashi et al. | 477/99 |
| 5,211,271 | 5/1993 | Osborn et al. | 477/96 X |
| 5,251,723 | 10/1993 | Rolinski et al. | 477/99 X |
| 5,431,266 | 7/1995 | Ito et al. | 192/4 A |
| 5,445,575 | 8/1995 | Sundeen | 477/99 |
| 5,489,246 | 2/1996 | Moody et al. | 477/99 X |
| 5,562,568 | 10/1996 | Smale | 477/99 |
| 5,588,330 | 12/1996 | Kataumi et al. | 192/4 A |
| 5,647,818 | 7/1997 | Moody | 477/99 |
| 5,657,654 | 8/1997 | Hoebel | 477/96 X |
| 5,695,029 | 12/1997 | Yokoyama et al. | 192/4 A |
| 5,752,414 | 5/1998 | Reasoner et al. | 477/96 X |

FOREIGN PATENT DOCUMENTS

| | | | |
|---|---|---|---|
| 0 378 244 A3 | 7/1990 | European Pat. Off. . | |
| 401182135 | 7/1989 | Japan | 477/99 |

*Primary Examiner*—Charles A. Marmor
*Assistant Examiner*—Ankur Parekh
*Attorney, Agent, or Firm*—Pollock Vande Sande & Amernick

[57] ABSTRACT

An automotive vehicle incorporating a transmission equipped with an actuating logic performing the "shift-lock" and "key-lock" functions. The actuator (2) releasing the lever (1) from position P is actuated during a predetermined interval when the brake is applied and the key is in the post-ignition position and, upon expiration of this interval and following reapplication of pressure to the brake pedal (4) after a brief release of the brake pedal (4), the actuator (2) is instantaneously actuated. Similarly, the actuator (10) allowing removal of the key is actuated during a predetermined interval when the shift lever is in the position P. Upon expiration of this interval and following a return of the key to the "accessories" position following a brief movement of the key to the post-ignition position, the actuator is instantaneously actuated.

19 Claims, 1 Drawing Sheet

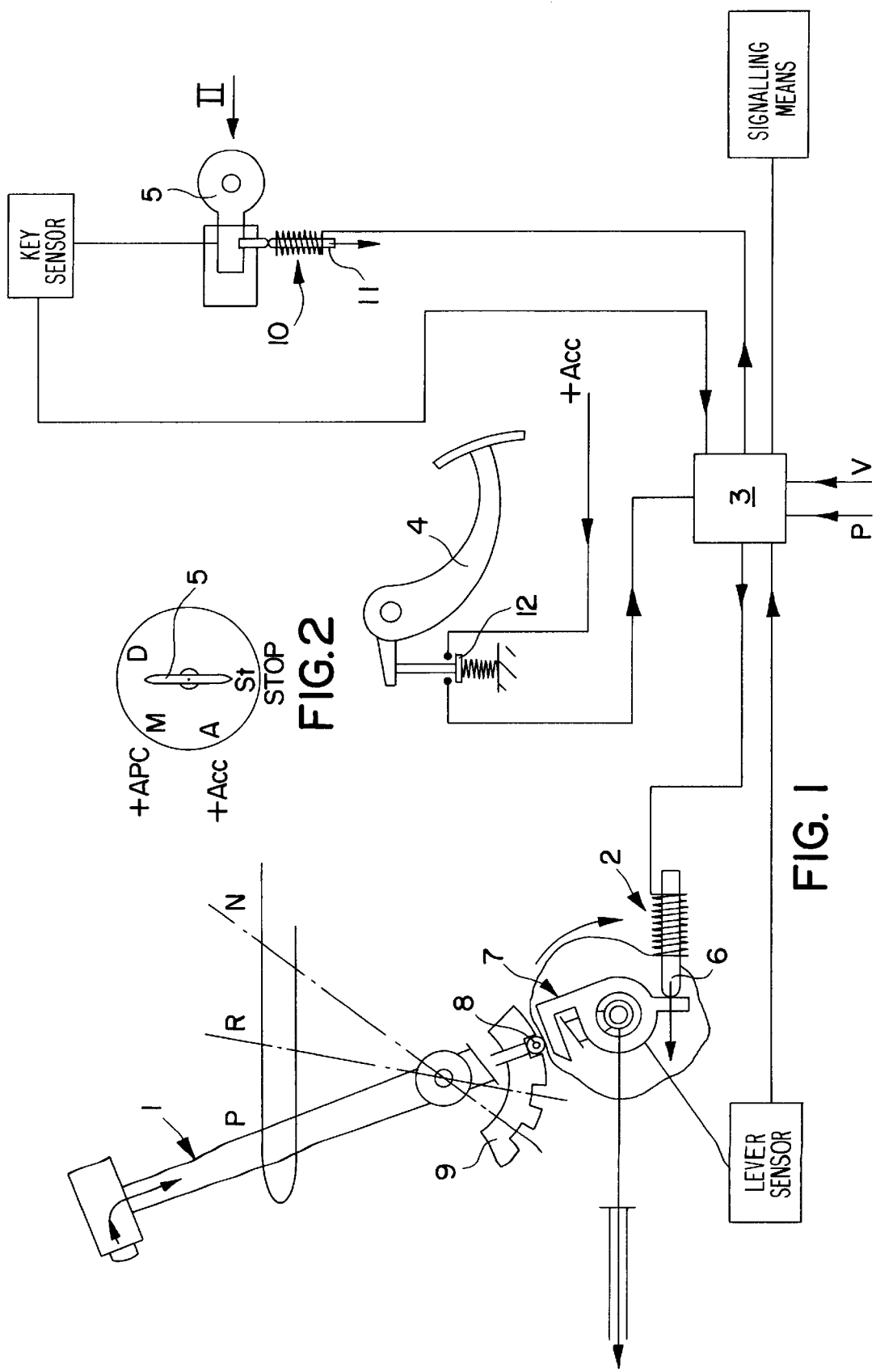

AUTOMOTIVE VEHICLE INCORPORATING A TRANSMISSION EQUIPPED WITH AN ACTUATING LOGIC PERFORMING THE "SHIFT-LOCK" AND "KEY-LOCK" FUNCTIONS

FIELD OF THE INVENTION

The present invention concerns an automotive vehicle incorporating an automatic transmission equipped with an actuating logic having as its function to lock the shift lever in the parking position "P", or "shift-lock" function, and to lock the ignition key, or "key-lock" function.

BACKGROUND OF THE INVENTION

The laws of some countries require that automotive vehicles with automatic transmissions be equipped with "shift-lock" and/or "key-lock" safety functions.

In accordance with the shift-lock function, when starting the automobile the shift lever can be moved out of the parking position P only if the driver presses on the brake pedal and if the key is turned so as to achieve ignition.

In accordance with the key-lock function, when the vehicle is stopped, the ignition key can be removed only if the lever is returned to the P position.

SUMMARY OF THE INVENTION

The invention proposes an actuating logic used, in particular, in an automatic transmission equipped with electronic control and providing greater safety and enhanced ease of use, while adhering to the laws in effect.

To this end, in accordance with the invention, the automotive vehicle incorporating an automatic transmission equipped with an actuating logic which locks the shift lever in the parking position P ("shift-lock" function) using an electromagnetic actuator actuated in order to release the lever from the position P when pressure is applied to the brake pedal of the vehicle and when the ignition key is in the position "+APC" or "+ACC," and/or which locks the ignition key ("key-lock" function) if the lever is not in the position P, by means of an electromagnetic actuator actuated in order to release the ignition key when the lever is in position P, is characterized by the fact that the actuator releasing the lever from the position P is actuated for a predetermined interval, for example one minute, and, upon expiration of this interval and following a brief release of the brake pedal, the actuator is instantaneously actuated.

Furthermore, the actuating logic is configured so as to actuate the actuator releasing the ignition key by using sensors sensitive to the position of the lever and of the ignition key or to the movement of one of the latter, the other being in a given position.

The actuator releasing the ignition key is activated when one of the aforementioned sensors supplies a signal indicating that the lever has been brought into position P before or after the other sensor supplies an ignition-cut-off signal.

In accordance with another operating mode, the actuator releasing the ignition key is activated for a predetermined interval, one minute for example; after expiration of this interval and following a brief return of the key to the +APC position, the actuator is instantaneously activated.

The actuator releasing the ignition key is actuated when one of the aforementioned sensors supplies a signal indicating movement of the ignition key from its +APC position to its ignition-cut-off position, and the other sensor supplies a signal indicating that the lever has been placed in the position P.

The actuator releasing the ignition key is activated from the ascending front of the signal emanating from the other sensor mentioned above.

In the event the actuating logic computer incorporates no +ACC input from the ignition key, this computer monitors the sensor which detects the status of the lever position for a limited, predetermined interval and, if the return of the lever to the position P occurs after the end of this predetermined period, a brief return of the key to the position +APC makes it possible to actuate the key-release actuator (10).

The actuating logic is, moreover, configured so as not to actuate the lever-release actuator instantaneously if the latter is moved to in position P while the ignition key is in the position +APC or ACC and while pressure is exerted on the brake pedal.

The electromagnetic actuator releasing the lever from position P is actuated when the lever is in position P, the ignition key is in position +APC or +ACC, and the vehicle is moving at a speed greater than a minimum value, for example about 3 km/hour.

The ignition key-release actuator is actuated when one of the aforementioned sensors supplies a signal indicating that the lever is in position P, and the other sensor supplies a signal indicating movement of the ignition key from its position +APC to its ignition-cut-off position.

The actuator releasing the ignition key is actuated from the descending front of the signal from the other aforementioned sensor.

The actuator releasing the lever from the position P is actuated only after expiration of a determined lag time, 5 seconds for example, if the brake pedal is kept depressed while the lever is moved into position P.

The actuating logic is also configured to activate the aforementioned actuator prior to expiration of the lag time, by releasing the brake pedal and pressing thereon once again.

An electronic computer is used to perform the "shift-lock" function in order to diagnose a malfunction of one of the sensors detecting the position of the lever in position P, the pressure on the brake pedal, vehicle speed, or the position of the ignition key, and to prevent actuation of the lever-release actuator in the event of a sensor malfunction detected by the computer, so that the driver can implement a so-called "release" safety function which, by means of a tool or a key, makes it possible to release the lever manually from the position P.

An electronic computer is also used to perform the "key-lock" function, in order to detect a malfunction of one of the sensors detecting the position of the lever in position P or the position of the ignition key, and, if the computer detects a malfunction of one of the sensors when the so-called "release" safety function is not available, this function making it possible, using a tool or a key, to release the ignition key manually, the actuator releasing the ignition key is actuated in such a way that only the functioning sensor is taken into account.

The vehicle also incorporates signaling means emitting a sound signal when the driver's door is open and when the lever is not in position P.

The transmission is preferably equipped with an electronic control mechanism.

BRIEF DESCRIPTION OF THE DRAWINGS

The invention will be better understood and other goals, features, details, and advantages thereof will emerge with greater clarity during the following explanatory description provided with reference to the attached schematic drawings depicting a conventional locking system making it possible to perform the two "shift-lock" and "key-lock" safety functions improved by virtue of the invention, and in which:

FIG. 1 illustrates an example of a conventional locking system used to perform the "shift-lock" and "key-lock" functions and installed in automotive vehicles incorporating an automatic transmission, preferably possessing electronic control; and FIG. 2 represents the various possible positions of the ignition key.

DETAILED DESCRIPTION

To lock the shift lever 1 in the parking position P as shown in FIG. 1 ("shift-lock" function), this system incorporates an electromagnetic actuator 2 actuated by an electronic unit 3 so as to release the lever 1 from the position P when pressure is applied to the brake pedal 4 of the vehicle and when the ignition key 5 is in position M (or post-ignition position +APC) or in position A (or the position "accessories +ACC)," which allows voltage to be fed to accessories consuming low current amounts, e.g., a radio, when the engine is shut off). The electromagnetic actuator 2 incorporates an electromagnet rod 6 acting on a mechanism 7 so as to release a locking end-piece 8 from a corresponding locking recess belonging to an angular sector 9 which is stationary in relation to the shift lever 1.

To lock the ignition key 5 ("key-lock" function) when the shift lever 1 is not in position P, the system incorporates an electromagnetic actuator 10 actuated by the electronic unit 3 so as to release the ignition key 5 when the lever 1 is in position P. The electromagnet rod 11 of the actuator 10 immobilizes rotation of the barrel when the lever 1 is not in position P, with the result that the key 5 cannot be moved from the position "+ACC" to the "stop" position allowing removal of the key 5. Thus, when the actuator 10 is fed by the unit 3, the key can be released or removed, but if voltage is not supplied to the actuator 10, the key is locked.

The "shift-lock" function makes it possible to guarantee the presence of a driver, who depresses the brake pedal 4, before allowing the engine to propel the vehicle and to avoid the abrupt start-up of the vehicle when the transmission is engaged.

The "key-lock" function prevents removal of the ignition key 5 from the vehicle if the lever 1 is not in position P. It prevents the risk of freeze-up of the steering wheel caused by the anti-theft device when the vehicle is moving and supplements the "shift-lock" function by prompting the driver to get out of the vehicle only if the lever 1 is in position P.

The vehicle is also equipped with a mechanism preventing start-up of the engine if the lever 1 is not in position P or N (neutral). It prevents potential jerks on the vehicle transmission when the engine is started, as well as ill-timed movements of the vehicle.

In accordance with the invention, an actuating logic, located, for example, in the electronic unit 3, is provided in order to actuate the electromagnetic actuator 2 in both of the following cases.

The first case relates generally to the normal release of the lever 1 from position P, that is, the lever is released using the electromagnetic actuator 2 when the lever is in position P and the ignition key 5 is in position +APC or +ACC and pressure is generated on the brake pedal 4 of the vehicle.

Pressure on the brake pedal 4 is detected by the rear stop-lamp switch 12, the information from which is transmitted to the electronic unit 3. To prevent useless commands, the actuating logic is configured so as not to actuate or power up the electromagnetic actuator 2 instantaneously if the lever 1 is moved to position P after the ignition key 5 is in the position +APC or +ACC and after pressure is exerted on the brake pedal 4. In this case, which corresponds to the normal stopping configuration of the vehicle, a delay, of five seconds for example, is initiated and the electromagnetic actuator 2 is actuated or powered up only after the delay has elapsed, provided that if the driver maintains pressure on the brake pedal 4. The actuating logic can be reconfigured so as to actuate the electromagnetic actuator 2 before expiration of this delay, by releasing the brake pedal 4 and by pressing down on it once again. In all other cases, that is, when the order of arrival of data relating to the position of the lever in position P, the position +APC or +ACC of the key and the pressure on the brake pedal 4 differ from those described above, and power supply to the actuator 2 or the actuation thereof is instantaneous.

The second case involving release of the lever 1 from position P by means of the actuator 2 occurs when the lever 1 is in position P, the ignition key is in position +APC or +ACC, and the vehicle moves at a speed V greater than a minimum value, for example of about 3 km/hour. A case this kind can occur when the vehicle is moving and the driver accidentally moves the lever 1 to position P.

Actuation of the actuator 2 is interrupted when the ignition key 5 is moved out of the position +ACC or when the lever 1 is moved from position P or the pressure on the brake pedal 4 is released.

Two special cases involving the logic activating the actuator 2 must be mentioned.

The first special case relates to the fact that the actuator 2 may be incapable of supporting continuous current feed. In this case, actuation of the actuator 2 may be restricted to a predetermined interval, one minute for example, while adhering to the following condition: upon expiration of this interval and following a brief release of the brake pedal 4, the actuator 2 is instantaneously activated by the electronic unit 3 and must be operational (the force generated must be strong enough to release the lever).

The second special case relates to the automatic hydraulic transmission without electronic actuation. For the sake of simplicity, management of the following functions, which are mentioned in the two cases described above relating to activation of the actuator 2, may be eliminated: i.e., non-actuation of the actuator 2 during return of the lever 1 to position P while the brake pedal 4 is depressed, and inhibition of the locking of the lever 1 when the vehicle is moving.

The actuation logic permits downgraded modes of operation, as follows. If the "shift-lock" function utilizes an electronic computer capable of diagnosing a malfunction of one of the sensors designed to detect the position of the lever 1, the pressure exerted on the brake pedal 4, the speed of the vehicle greater than or equal to 3 km/hour, or the position of the ignition key 5, and if the computer has diagnosed a malfunction of this kind, actuation of the actuator 2, is prohibited. In such an instance, the driver should use the so-called 'release" assistance function, which, through the use of a tool or key, makes it possible to release the lever manually from position P.

The actuating logic is also designed to activate the actuator 10 releasing the ignition key 5 using sensors sensitive to the position of the lever 1 and of the ignition key 5, or to the movement of one of the latter, the other being in a given position.

Thus, this actuating logic is designed to activate the actuator 10 in the three following cases.

In the first case bearing on actuation of the actuator 10 releasing the ignition key 5, one of these sensors supplies a signal indicating that the lever 1 is in position P, and the other sensor supplies a signal indicating movement of the ignition key 5 from its position +APC to its position in which feed to the vehicle engine is cut off. In this case, power to the actuator 10 is supplied from the descending front of the signal from the sensor of the position of the key 5.

In the second case involving actuation of the actuator 10, the sensor detecting the position of the lever 1 supplies a signal indicating that this lever has been brought into position P before or after the sensor detecting the position of the key 5 supplies an ignition-cut-off signal (independently, therefore, of the position of the key).

In the third case entailing actuation of the actuator 10 in order to release the key 5, the engine feed switch is first cut off and the lever 1 is brought into position P. In this case, the actuator 10 is fed by an ascending front of the signal from the sensor detecting the position P of the lever 1. The period devoted to monitoring the state of the sensor of position P of the lever can be limited, as will be seen in one of the specific cases below.

Actuation of the actuator 10 is interrupted when the ignition key 5 is moved from its position +ACC or when the lever 1 leaves its position P. Cut-off of the feed to the actuator 10 can also be effected after a time lag, as explained below in a first special case involving actuation of the actuator 10.

This first special case concerns the fact that the actuator 10, like the actuator 2, may not support a continuous power feed. In this instance, the feed time of the actuator 10 can be limited to a predeterminate interval, one minute for example, while adhering to the condition that, upon expiration of this interval and following brief return of the ignition key 5 to the position +APC, provided that the lever is in position P, the actuator 10 must be actuated instantaneously and must be operational (the force generated must be strong enough to ensure release).

In a second special case involving activation of the actuator 10, the computer connected to the actuating logic of the actuator 10 incorporates no input +ACC; that is, it receives no information coming from the contact terminal +ACC of the lock of the ignition key 5. In this case, the monitoring time detecting the state of the position P can be limited to an interval to be specified on a case-by-case basis. Limiting this interval is necessary only if the current consumed by the computer during monitoring of the state of position P cannot be continuously provided by the vehicle battery. If the return of the lever 1 to position P occurs after this interval, the driver must briefly move the ignition key 5 to the position +APC to supply to the electronic unit 3 an actuating pulse before releasing the key 5. A return of the ignition key to the +ACC position following a brief movement of the key to the +APC position results in instantaneous actuation of the actuator 10.

A third special case involving actuation of the actuator 10 concerns the automatic transmission without electronic actuation of the actuator releasing the ignition key. In this case, the actuator 10 is fed when the key 5 is in position +ACC and the lever 1 in position P, accompanied by a potential delay, as in the first special case.

The logic actuating the actuator 10 also allows downgraded modes, as follows. If the "key-lock" function uses a computer capable of diagnosing a malfunction of one of the two sensors detecting the position of the lever 1 and of the ignition key 5, two cases exist: if the "release" function is not available, the actuation logic considers only the single functioning sensor in order to feed the actuator 10 (for example, if the computer detects a problem relating to detection of the position of the ignition key 5, the actuator 10 will be fed as soon as the lever 1 is in position P). If the "release" function is available, power feed to the actuator 10 is not obligatory. The "release" function makes it possible, using a tool or a key, to release the key manually.

The vehicle may also be equipped with a function warning of the failure to return the lever to position P. To this end, warning means emit a sound signal if the driver's door is opened when the lever 1 is in a position other than position P. This function supplements the "shift-lock" function by prompting the driver not to leave the vehicle when the lever is in a position other than position P, for example the neutral position N while the vehicle engine is running.

The actuation logic according to the invention described above gives a higher degree of safety and greater ease of use, while adhering to legal requirement.

What is claimed is:

1. An automotive vehicle incorporating an automatic transmission, said automatic transmission having means to lock a shift lever in a parking position P, or "shift-lock" function, said means comprising an electromagnetic actuator actuated by an electronic unit incorporating software in order to release the lever from the position P when pressure is exerted on a brake pedal of the vehicle and when an ignition key is in a post-ignition position or an "accessories" position, and functioning to lock the ignition key, or "key-lock" function, if the lever is not in position P, using another electromagnetic actuator actuated in order to release the ignition key when the lever is in position P, wherein the actuator releasing the lever from position P is actuated during a first predetermined interval during brake application and proper key position, and upon expiration of this interval a brief release of the brake pedal followed by reapplication of the brake pedal instantaneously actuates the actuator, and wherein the software is configured so as to actuate the actuator releasing the ignition key using sensors sensitive to the position of the lever and of the ignition key or to the movement of one of the two, the other being in a given position, and wherein the actuator releasing the ignition key is actuated during a second predetermined interval when the shift lever is in the position P and, upon expiration of this interval, a return of the ignition key to the "accessories" position following a brief movement of the key to the post-ignition position instantaneously actuates the actuator.

2. The vehicle according to claim 1, wherein said first predetermined interval is about one minute long.

3. The vehicle according to claim 1, wherein the actuator releasing the ignition key is actuated when one of the sensors supplies a signal indicating that the lever has been brought into position P, before or after the other sensor supplies an ignition-cut-off signal.

4. The vehicle according to claim 1, wherein said second predetermined interval is about one minute long.

5. The vehicle according to claim 1, wherein the actuator releasing the ignition key is actuated when one of the sensors supplies a signal indicating movement of the ignition key from its post-ignition position to its ignition-cut-off position, and the other sensor supplies a signal indicating that the lever has been brought into position P.

6. The vehicle according to claim 5, wherein the actuator releasing the ignition key is actuated when the value of the signal from the other sensor begins to increase.

7. The vehicle according to claim 5, wherein, in the case in which said electronic unit has no "accessories" input from the ignition key, this computer monitors the sensor detecting the status of the position of the lever during a predetermined, limited interval, and, if the return of lever to position P takes place after expiration of this predetermined interval, a brief return of the key to the post-ignition position makes it possible to actuate the actuator releasing the ignition key.

8. The vehicle according to claim 1, wherein the software is also configured so as not to actuate instantaneously the actuator releasing the lever if the latter is moved into position P, while the ignition key is in the post-ignition or "accessories" position and if pressure is exerted on the brake pedal.

9. The vehicle according to claim 8, wherein the electromagnetic actuator releasing the lever from the position P is actuated when the lever is in position P, the ignition key is in the post-ignition or "accessories" position, and the vehicle is moving at a speed greater than a minimum speed.

10. The vehicle according to claim 9, wherein said minimum speed is about 3 km/hour.

11. The vehicle according to claim 1, wherein the actuator releasing the ignition key is actuated when one of the aforementioned sensors supplies a signal indicating that the lever is in the position P and the other sensor supplies a signal indicating a movement of the ignition key from its post-ignition position to its ignition-cut-off position.

12. The vehicle according to claim 11, wherein the actuator releasing the ignition key is actuated when the value of the signal from the other aforementioned sensor begins to decrease.

13. The vehicle according to claim 1, wherein the actuator releasing the lever from position P is actuated only upon expiration of a determinate time lag after depression of the brake pedal.

14. The vehicle of claim 13, wherein said determinate time lag is about five seconds long.

15. The vehicle according to claim 13, wherein the software is also configured to actuate the actuator actuated to release the lever from the P position before expiration of the time lag, by releasing and then reapplying said brake pedal.

16. The vehicle according to claim 1, wherein an electronic computer is used for the "shift-lock" function, in order to diagnose a malfunction of one of the sensors detecting the position of the lever in position P, the pressure generated on the brake pedal, the speed of the vehicle, or the position of the ignition key, and to prevent actuation of the actuator releasing the lever in the event of sensor malfunction detected by the computer, so that the driver may use a "release" assistance function making it possible to release the lever manually from position P by use of a tool or a key.

17. The vehicle according to claim 1, wherein an electronic computer is used for the "key-lock" function, in order to diagnose a malfunction of one of the sensors used to detect the position of the lever in position P or the position of the ignition key, and, if the computer detects a malfunction of one of the sensors in the absence of a "release" assistance function which makes it possible to release the ignition key manually by use of a tool or key, the actuator releasing the ignition key is actuated while taking into account only the single functioning sensor.

18. The vehicle according to claim 1, wherein said vehicle incorporates means which emit a sound signal when the driver's door is opened when the lever is not in position P.

19. The vehicle according to claim 1, wherein the transmission is equipped with an electronic control mechanism.

* * * * *